No. 883,820. PATENTED APR. 7, 1908.
E. S. MENERE.
CANT HOOK.
APPLICATION FILED JUNE 3, 1907.
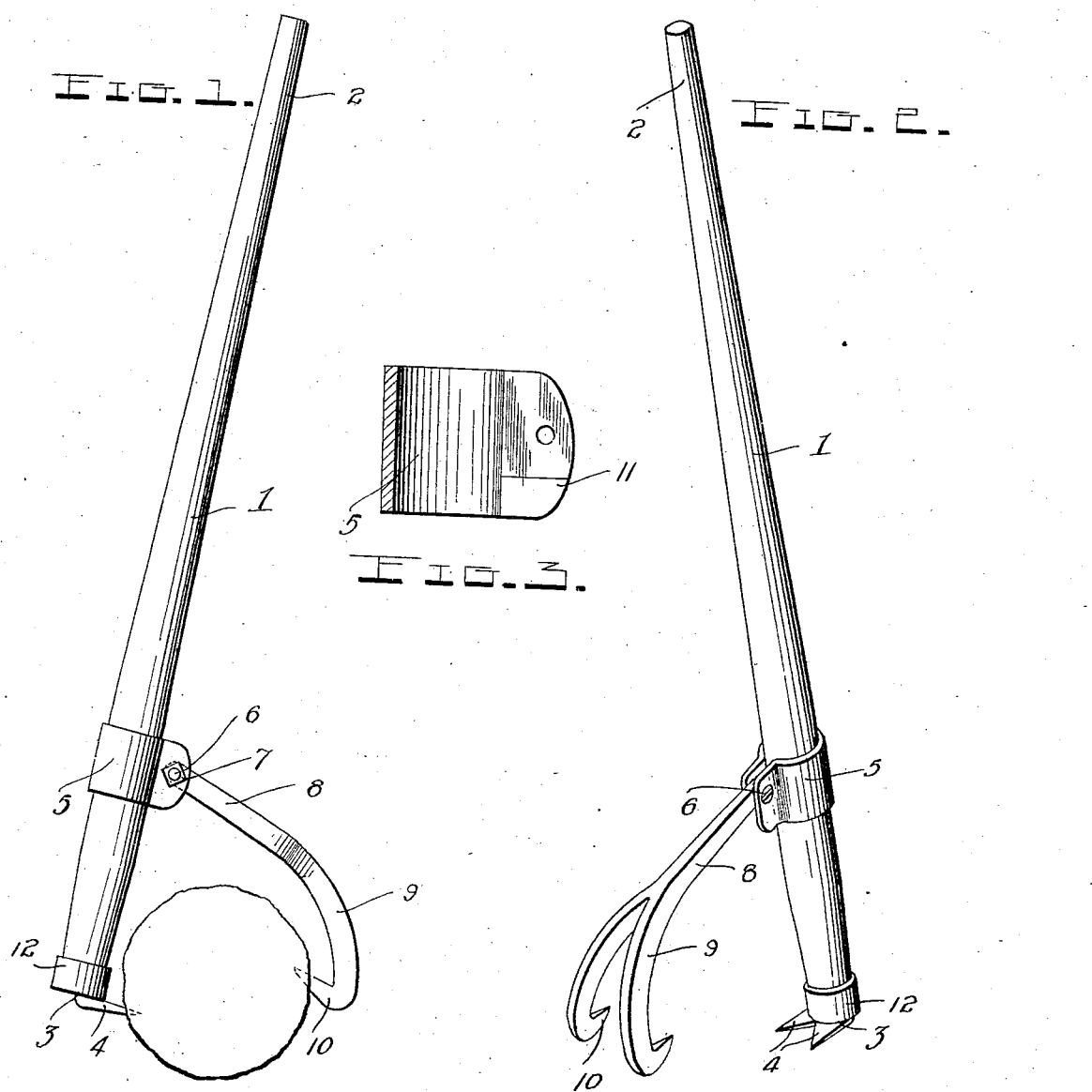
Witnesses
Chas. L. Griesbauer,
C. H. Griesbauer.
Inventor
Edward S. Menere.
by H. B. Willson & Co.
Attorneys

UNITED STATES PATENT OFFICE.

EDWARD S. MENERE, OF GERMFASK, MICHIGAN.

CANT-HOOK.

No. 883,820.  Specification of Letters Patent.  Patented April 7, 1908.

Application filed June 3, 1907. Serial No. 377,034.

*To all whom it may concern:*

Be it known that I, EDWARD S. MENERE, a citizen of the United States, residing at Germfask, in the county of Schoolcraft and State of Michigan, have invented certain new and useful Improvements in Cant-Hooks; and I do declare the following to be a full, clear, and exact description of the invention, such as will enable others skilled in the art to which it appertains to make and use the same.

My invention has relation to new and useful improvements in cant hooks and has for its object the production of a simple and economical device of this character by means of which logs or other timber may be handled in an easy and expeditious manner.

With the foregoing and other objects in view which will appear as the nature of the invention is better understood, the invention consists in certain novel features of construction, combination and arrangement of parts as will be hereinafter fully described and claimed.

In the accompanying drawings, Figure 1 is a side elevation of a cant hook constructed in accordance with my invention applied to a log. Fig. 2 is a perspective view of the cant hook; and Fig. 3 is a vertical sectional view of a clip constituting one of the elements of my invention.

Referring more particularly to the drawings, the numeral 1 represents a lever which is preferably reduced at one end to provide a hand or grip portion 2 and has secured in its opposite end a brad 3 having diverging prongs 4 extending substantially at right angles with the longitudinal axis of the lever. The numeral 5 represents a clip which removably encircles said lever at a suitable point from said brad and has pivotally connected between its ends by a screw and nut 6 and 7 respectively, one end of a dog 8 provided at its free end with two oppositely-disposed diverging arms 9 terminating in hooks 10. Said clip 5 is provided near its ends on its inner face with two laterally-projecting portions 11 adapted to engage one edge of the pivoted end of said dog and limit the movement of the same inwardly. 12 represents a ring encircling the inner end of said lever adjacent said double brad.

From the foregoing description taken in connection with the accompanying drawings, the construction and operation of the invention will be readily understood without requiring a more extended explanation.

Having thus described my invention, what I claim as new is:—

In a cant hook, a lever, prongs extending at right angles from one end thereof, a clip intermediate the ends of the lever, lateral ears upon said clip, and a dog having one end of a straight shank journaled in between said ears, its other end terminating in a pair of integral diverging hook arms, together with engaging points on said arms extending toward the lever in a line substantially parallel with the shank.

In testimony whereof I have hereunto set my hand in presence of two subscribing witnesses.

EDWARD S. MENERE.

Witnesses:
NORMAN STAUFFER,
BEATRICE MUSSELMAN.